Oct. 25, 1949.    A. KOST    2,485,893
UNIVERSAL JOINT
Filed Oct. 29, 1945
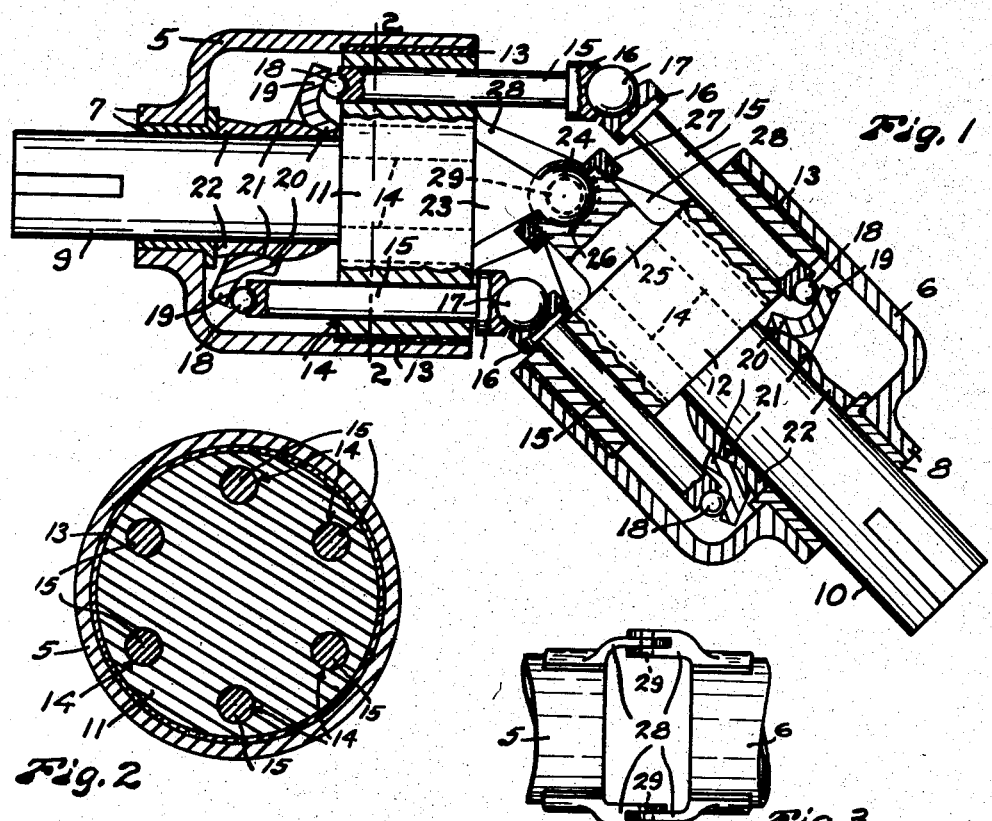
Fig. 1
Fig. 2
Fig. 3
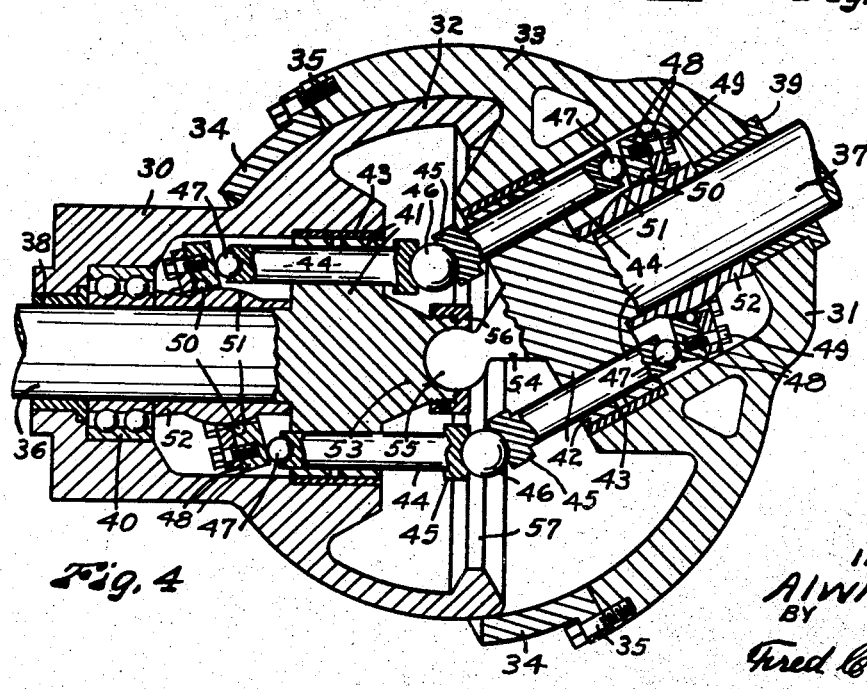
Fig. 4
INVENTOR
Alwin Kost
BY
Fred C. Matheny
ATTORNEY Patented Oct. 25, 1949

2,485,893

UNITED STATES PATENT OFFICE 2,485,893

UNIVERSAL JOINT

Alwin Kost, Portland, Oreg.

Application October 29, 1945, Serial No. 625,117

9 Claims. (Cl. 64—20)

This invention relates to universal joints or flexible couplings of a type used to provide a driving connection between two shafts that are axially dis-aligned relative to each other.

An object of this invention is to provide a highly efficient universal joint that will operate with a minimum amount of friction to transmit rotary motion between two shafts that have a relatively great angular dis-alignment and between two shafts whose angle of dis-alignment is variable.

Another object is to provide a universal joint that is strong, durable and compact in construction, that is not expensive to manufacture, and one that is capable of use where relatively great angles of dis-alignment between two shafts are involved.

Another object is to provide a universal joint in which substantially all of the moving parts of the joint are of rolling contact or anti-friction type thereby reducing friction within the joint to a minimum.

Another object of this invention is to provide a universal joint in which two shafts that are capable of relatively great dis-alignment are provided with a torque connection in the nature of interconnecting pistons that are slidably movable, in directions longitudinally of the shafts.

Other objects of the invention will be apparent from the following description taken in connection with the accompanying drawings.

In the drawings

Figure 1 is a longitudinal sectional view of a universal joint constructed in accordance with this invention and comprising two housing members adapted for relative angular movement in one plane.

Fig. 2 is a sectional view of the same taken on broken line 2—2 of Fig. 1.

Fig. 3 is a fragmentary plan view on a smaller scale than Fig. 1 showing transverse pivot means connecting together two housing members shown in Fig. 1.

Fig. 4 is a longitudinal sectional view of a universal joint constructed in accordance with this invention and which has spherical housing means to provide universal movement between the two housing members of the joint.

Like reference numerals designate like parts throughout the several views.

Figs. 1, 2 and 3 show two longitudinally spaced apart cup shaped housing members 5 and 6 that are provided with axial bearings 7 and 8 respectively to receive shafts 9 and 10.

Shafts 9 and 10 are respectively provided with enlarged cylindrical head portions 11 and 12 that are rotatively supported in bearing members 13 in the respective housings 5 and 6.

Each head 11 and 12 is provided with a plurality of cylindrical passageways 14. Each passageway 14 has a piston rod 15 slidably disposed therein. The pistons 15 are positioned near the periphery of each head 11 and 12, are parallel with the axes of said heads 11 and 12, are preferably spaced equal distances apart and are all spaced the same distance from the axes of said heads 11 and 12. Obviously the number of pistons 15 used in each assembly may be varied.

Each piston 15 has an enlarged portion 16 on the end thereof that protrudes beyond its housing 5 or 6 and each enlarged portion 16 is spherically recessed for the reception of a ball 17. The pistons in the two heads 11 and 12 are paired and a ball 17 is provided between the opposed ends of each pair of pistons.

The outer ends of the pistons 15 are positioned in the housings 5 and 6 and are spherically recessed for the reception of balls 18 that bear against collars 19. Each collar 19 has a spherical portion 20 that is mounted on an external spherical surface 21 of a sleeve 22. One sleeve 22 is carried by each of the shafts 9 and 10 and is held against movement longitudinally of its shaft.

The spherical portions 20 of the collars 19 can oscillate on the spherical surfaces 21 of sleeves 22 but can not be passed over the spherical surfaces 21. The collars 19 are put onto the shafts 10 before the sleeves 22 are put on the shafts 9 and 10 and are between the sleeves 22 and heads 11 and 12. These collars 19 fit the spherical surfaces 21 and can be moved, like swash plates, on the spherical surfaces 21 but can not be pushed outwardly over the spherical surfaces 21.

The outer ends of the sleeves 22 thrust against the inner end portions of bearing members 8.

The head portions 11 and 12 are connected with each other so that they can be relatively moved angularly but can not be separated or moved apart. This connection is made by providing on one of the head members, such as the head member 11, an axially arranged, integral protruding stem 23 that terminates in an integral ball 24 and by providing on the other head member 12 an integral axially arranged protruding stem 25 having a socket 26 to receive the ball 24 and having a cap or collar 27 adapted to threadedly engage with the stem 25. The cap or collar 27 may be made of two or more pieces so that it can be assembled on the shank 23 and will not come off over the ball 24 when it is threaded onto the stem 25. The collar 27 can thus be used to connect the two heads 11 and 12 together in such a manner that these two heads can be moved relative to each other to vary the relative inclination of their axes but can not be moved apart.

The housing members 5 and 6 are provided, on their opposed inner ends and at diametrically opposite points, with protruding ears 28 that overlap and are secured together by coaxial pivot members 29. The common axis of the pivot members 29 passes through the center of the ball 24. Thus the two housing members 5 and 6 and parts connected therewith can be relatively moved angularly on the common axis of pivot members 29 but do not have relative universal angular movement.

In the operation of the structure shown in Figs. 1, 2 and 3 the two shafts 9 and 10 may be dis-aligned a maximum amount in one direction as shown in Fig. 1, or may be dis-aligned a similar maximum amount in an opposite direction, or they may be in any relative position between the two maximum positions of dis-alignment above mentioned. Either of these shafts may be driven and rotation will be transmitted to the other shaft by the pistons 15 which are locked together, as respects transverse displacement, by the balls 17. The pistons 15 are freely movable endwise in the heads 11 and 12 and are held in close engagement with the larger balls 17 by contact of the smaller balls 18 with the collars 19. This engagement with balls 17 is maintained irrespective of the positions of the pistons 15. The collars 19 move freely and with a small amount of friction on the spherical surfaces 21.

The pistons 15 transmit the torque from the driving to the driven shaft smoothly and without substantial loss of power even when the two shafts are operating at high speed and in a position of maximum dis-alignment, as shown in Fig. 1.

The structure shown in Fig. 4 comprises two housing members 30 and 31 which are respectively provided with spherical portions 32 and 33. The spherical portion 32 is of smaller diameter than the portion 33 and interfits within the portion 33. An extension member 34 of spherical shape is secured to the spherical portion 33 by cap screws 35. The extension member 34 fits snugly over the spherical portion 32 and secures the two housing members 30 and 31 together so that they can not be pulled apart endwise, but leaves said housing members 30 and 31 free to move angularly in all directions relative to each other.

Two shafts 36 and 37 are journaled in bearing members 38 and 39 in the respective housings 30 and 31. A combined radial and thrust ball bearing 40 is provided in the housing member 30 adjacent the inner end of the bearing member 38. The shafts 36 and 37 are provided respectively with rigidly connected head portions 41 and 42, of larger diameter than the shafts, that are rotatably supported in bearing sleeves 43 in the housing members 30 and 31.

Pistons 44 are slidably disposed in suitable bores in the head members 41 and 42. The pistons 44 are similar to the previously described pistons 15 and have enlarged recessed end portions 45 within which balls 46, similar to balls 17 of Fig. 1, are seated.

The other ends of the pistons 44 are spherically recessed to receive balls 47 that bear against collars 48. Each collar 48 is preferably made of two plate members that are secured together by cap screws 49. Ball bearings 50 are operatively held by the two plates of each collar 48 and roll on spherical portions 51 of sleeves 52. One sleeve 52 is held between the head member 41 and the combined radial and thrust bearing 40. The other sleeve 52 is held between the head member 42 and the bearing member 39.

The head members 41 and 42 are respectively provided with coaxial integral stem portions 53 and 54 that protrude toward each other. A spherical socket in the end of stem portion 53 receives a ball 55 on the end of stem portion 54 and a collar or cap 56 on stem 54 is threaded onto stem 53 to secure the two stem portions 53 and 54 and parts connected therewith together and at the same time leave these parts free to move angularly relative to each other. Preferably the collar 56 is made of two or more pieces to facilitate assembly of said collar over the stem 54.

Preferably an inwardly directed flange 57 is provided within the inner end portion of spherical member 32 for reinforcing and strengthening the same.

The universal joint or coupling shown in Fig. 4 is similar in structure and mode of operation to the previously described coupling shown in Figs. 1 to 3 except that the ball and socket type housing structure shown in Fig. 4 entirely houses the working parts of the coupling and provides for universal angular movement in all directions between the two housing members 30 and 31 and parts carried thereby. The interior of the ball and socket housing of Fig. 4 may be filled with oil or grease to insure complete and thorough lubrication. Power may be applied to either of the shafts 36 or 37 of Fig. 4 to drive the other shaft but preferably the shaft 36 will be the driving shaft. The pistons 44 transmit the torque from one shaft to the other smoothly and in a highly efficient manner and with a minimum loss of power and the shafts can be driven at high speeds. The ball bearings 50 operate smoothly and with a minimum amount of friction on the spherical surfaces 51 and always serve to maintain all of the pistons 44 in proper end to end relation irrespective of relative angular movements of shafts 36 and 37 and parts connected therewith. The diameter of a circle coincident with the bearing surfaces of the annular train of balls 50 is slightly less than the maximum diameter of the spherical surfaces 51 and the collars 48 are applied or put on over the inner ends of the sleeves 52, i. e. the ends of said sleeves toward the heads 41 and 42. Thus the collars 48 can not be pushed outwardly, i. e. in a direction away from the heads 41 and 42, over the spherical surfaces 51.

Both of the universal joints herein disclosed can be operated at high speeds without substantial vibration as the pistons therein will move smoothly and in evenly balanced relation.

The foregoing description and accompanying drawings clearly disclose preferred embodiments of this invention but it will be understood that changes in the same may be made within the scope and spirit of the following claims.

I claim:

1. In a universal joint, two shafts supported for rotation in dis-aligned relation; pistons slidably carried by said shafts; and balls socketed between adjoining pistons preventing sidewise displacement of the pistons and providing a driving relation between the shafts.

2. In a universal joint, two shafts supported for rotation in dis-aligned relation; a plurality of pistons slidably carried by each shaft and arranged in pairs with the ends of the two pistons of each pair adjoining; a ball socketed in the adjoining ends of each pair of pistons providing a connection therebetween preventing sidewise displacement of the pistons; and means holding all of said pistons in engagement with the balls that are socketed therebetween.

3. In a universal joint, two housing members disposed in end to end relation; means connecting said two housing members for relative angular movement; two shafts journaled in said two housing members; a head portion of larger diameter than the shaft on each of said shafts; a plurality of pistons slidably carried by each head portion and arranged in pairs with the two pistons of each pair in end to end registration; a ball socketed in the adjacent ends of the two pistons of each pair; and means holding the two pistons of each pair in engagement with the ball that is socketed therebetween.

4. In a universal joint, two housing members disposed in end to end relation; means connecting said two housing members for relative angular movement; two shafts journaled in said two housing members; a head portion of larger diameter than the shaft on each of said shafts; ball and socket means interconnecting said two head portions; a plurality of pistons slidably carried by each head portion and arranged in pairs with the two pistons of each pair in end to end registration; a ball socketed in the adjoining ends of each pair of pistons; and means holding the two pistons of each pair in engagement with the ball that is socketed therebetween.

5. In a universal joint, two housing members positioned end to end; means connecting said two housing members for angular movement relative to each other; two shafts journaled in said two housing members respectively; a head portion of larger diameter than the shaft on each of said shafts, each head portion being journaled in a housing member; a plurality of pistons carried by each head portion in angularly spaced relation and in spaced relation from the axis of the head portion, each piston being parallel with the joint axis of the head portion and shaft and being longitudinally movable, the pistons in the two head portions being arranged in pairs with the ends of the two pistons of each pair in registration; sockets in the adjoining end portions of said pistons; a ball disposed in the end sockets of each pair of pistons and means for holding the two pistons of each pair in engagement with the ball therebetween whereby said two shafts will be connected together for joint rotation.

6. In a universal joint, two housing members positioned end to end; means connecting said two housing members for angular movement relative to each other; two shafts journaled in said two housing members respectively; a head portion of larger diameter than the shaft on each of said shafts, each head portion being journaled in a housing member; a plurality of pistons carried by each head portion in angularly spaced relation and in spaced relation from the axis of the head member, each piston being parallel with the joint axis of the head member and shaft and being longitudinally movable, the pistons in the two head portions being arranged in pairs with the ends of the two pistons of each pair in registration; a ball socketed in the adjoining ends of each pair of pistons preventing sidewise displacement of the two pistons of the pair; a sleeve on each shaft having an external arcuate surface; and a collar mounted for oscillation on the arcuate surface of each sleeve and engaging with the outer end portions of the pistons to maintain said pistons in engagement with the balls that are socketed therein.

7. In a universal joint, two housing members positioned end to end; means connecting said two housing members for angular movement relative to each other; two shafts journaled in said two housing members respectively; a head portion of larger diameter than the shaft on each of said shafts, each head portion being journaled in a housing member; ball and socket means interconnecting the said two head portions preventing relative endwise movement thereof; a plurality of pistons slidably carried by each head portion in spaced relation from each other and in spaced relation from and parallel to the axis of the head portion, the pistons in the two head portions being arranged in pairs and having adjoining registering ends; a ball socketed in the adjoining ends of each pair of pistons establishing a driving relation therebetween; a sleeve on each shaft outwardly of the head portion thereof, each sleeve having an external arcuate bearing surface, a collar mounted for oscillation on said arcuate bearing surface; and a ball interposed between the outer end of each piston and one of said sleeves, whereby said collars will maintain engagement of said pistons with said first mentioned balls during rotation and relative angular movement of said shafts.

8. In a universal joint, two housing members disposed in end relation; two shafts journaled in said two housing members; a head portion of larger diameter than the shaft on each of said shafts; a plurality of pistons slidably carried by each head portion in parallel relation to the axis of the head portion, the pistons in the two head portions being arranged in pairs with adjoining ends of the two pistons of each pair in registration; a ball socketed in the adjoining ends of the two pistons of each pair; means holding all of said pistons in engagement with the balls that are socketed therebetween; and hollow spherical ball and socket means carried by said housing means providing a grease tight enclosure for the joint and a universal connection between the two housing members.

9. In a universal joint, two housing members positioned end to end; two shafts journaled in said two housing members respectively; a head portion of larger diameter than the shaft on each of said shafts; a plurality of pistons slidably carried by each head portion in spaced relation from each other and in spaced relation from and parallel with the axis of the head portion, the pistons in the two head portions being arranged in pairs with adjoining registering ends; a ball socketed in the adjoining ends of the two pistons of each pair establishing a driving relation therebetween; a sleeve on each shaft outwardly of the head portion thereof, each sleeve having an external arcuate bearing surface, a collar mounted for oscillation on said arcuate bearing surface; a ball interposed between the outer end of each piston and one of said sleeves, whereby said collars will maintain engagement of said pistons with said first mentioned balls when said shafts are rotated and angularly moved relative to each other; and hollow spherical ball and socket means carried by said housing means providing a grease tight enclosure for the mechanism of the joint and providing a universal connection between the two housing members.

ALWIN KOST.

REFERENCES CITED

The following references are of record in the file of this patent:

UNITED STATES PATENTS

| Number | Name | Date |
|---|---|---|
| 1,896,133 | Chilton | Feb. 7, 1933 |

FOREIGN PATENTS

| Number | Country | Date |
|---|---|---|
| 117,773 | Austria | 1930 |
| 440,042 | Great Britain | 1936 |
| 522,831 | Germany | 1931 |